US007565646B2

(12) United States Patent
Le Metayer et al.

(10) Patent No.: US 7,565,646 B2
(45) Date of Patent: Jul. 21, 2009

(54) METHOD FOR COMPRESSION OF OBJECT CODE INTERPRETED BY TREE-STRUCTURED EXPRESSION FACTORIZATION

(75) Inventors: Daniel Le Metayer, Le Chesnay (FR); Renaud Marlet, Paris (FR); Arnaud Venet, Paris (FR); Alexandre Frey, Paris (FR)

(73) Assignee: Trusted Logic, Versailles (FR)

( * ) Notice: Subject to any disclaimer, the term of this patent is extended or adjusted under 35 U.S.C. 154(b) by 1136 days.

(21) Appl. No.: 10/485,600

(22) PCT Filed: Jul. 23, 2002

(86) PCT No.: PCT/FR02/02672

§ 371 (c)(1),
(2), (4) Date: Feb. 2, 2004

(87) PCT Pub. No.: WO03/017097

PCT Pub. Date: Feb. 27, 2003

(65) Prior Publication Data

US 2004/0243985 A1    Dec. 2, 2004

(30) Foreign Application Priority Data

Aug. 3, 2001  (FR) .................................. 01 10518

(51) Int. Cl.
*G06F 9/45* (2006.01)
(52) U.S. Cl. ........................ 717/139; 717/144
(58) Field of Classification Search ......... 717/139–140, 717/148, 149, 151–154, 118, 136, 144–146
See application file for complete search history.

(56) References Cited

U.S. PATENT DOCUMENTS

| | | | | |
|---|---|---|---|---|
| 5,794,044 A * | 8/1998 | Yellin | | 717/139 |
| 6,151,618 A * | 11/2000 | Wahbe et al. | | 718/1 |
| 6,691,305 B1 * | 2/2004 | Henkel et al. | | 717/136 |
| 6,732,256 B2 * | 5/2004 | Henkel et al. | | 712/208 |
| 6,952,820 B1 * | 10/2005 | Schultz et al. | | 717/151 |
| 2002/0029250 A1 * | 3/2002 | Reiner | | 709/206 |
| 2002/0038454 A1 * | 3/2002 | Trux | | 707/159 |
| 2002/0107881 A1 * | 8/2002 | Patel | | 707/500 |
| 2002/0126116 A1 * | 9/2002 | Grzeszczuk et al. | | 345/420 |
| 2003/0012129 A1 | 1/2003 | Lee | | |
| 2003/0108029 A1 | 6/2003 | Behzadi | | |

OTHER PUBLICATIONS

Clausen et al. "Java Bytecode Compression for Low-End Embedded Systems", May 200, ACM, TOPLAS, vol. 22, Issue 3, pp. 472-489.*
Stamatelakis et al., "IP Layer Restoration and Network Planning Based on Virtual Protection Cycles," IEEE J. on Selected Areas in Communications, vol. 18, No. 10, Oct. 2000, pp. 1938-1949.

* cited by examiner

*Primary Examiner*—Wei Y. Zhen
*Assistant Examiner*—Anna Deng
(74) *Attorney, Agent, or Firm*—Browdy and Neimark, P.L.L.C.

(57) ABSTRACT

A method for compressing an interpreted object code in a system using an interpreter, by identifying, in the interpreted object-coded program, similar non-contiguous groups of instructions, of arbitrarily complex structure, by replacing all or part of said groups in the interpreted object code of the program with newly-created specialized instructions and by instrumenting the interpreter and/or the interpreted object code of the program so as to render it capable of implementing the newly-created instructions.

7 Claims, 3 Drawing Sheets

Execution of the specialised instruction *ssub_sadd_baload* using a single stack

METHOD FOR COMPRESSION OF OBJECT CODE INTERPRETED BY TREE-STRUCTURED EXPRESSION FACTORIZATION

BACKGROUND OF THE INVENTION

1. Field of the Invention

This present invention concerns a method for the compression of interpreted object code by the factorisation of arborescent expressions.

2. Description of the Prior Art

In general, it is known that embedded systems which have data processing resources, such as smartcards (with microprocessor) or analogue cards for example, are designed so as to execute object codes obtained by the compilation of a source program, usually written in a high-level language. As a consequence, these systems comprise an interpreter which performs software interpretation of the instructions of the object code into machine-code instructions which are directly executable by the microprocessor. This interpreter can be installed, for example, in a memory associated with the microprocessor, in general a read-only memory (ROM) or a programmable memory.

It so happens that many applications use embedded systems which are as small as possible, and this involves limiting the size of memories and therefore of the application programs used.

With the aim of partially surmounting this problem, a proposal has been put forward for compacting the source code.

However, this solution has the disadvantages that it cannot be used in the event that one does not have the source code (which is the case most of the time) and the requirement to instrument the generator of interpreted object code, which is a highly complex tool.

Furthermore, a proposal has also been made to perform compacting of the interpreted object code by searching in the object code for successive identical standard instruction sequences, and counting the occurrences of these identical sequences. A test to decide whether this number of occurrences is greater than a reference number is then used to decide whether or not to create a specific code instruction with which the sequence is associated. A replacement for each occurrence of the sequence by the specific instruction code is effected in the interpreted object code in order to generate a compacted object code with which an execution file is associated.

In fact, this compression method performs a factorisation of instruction groups in the program in interpreted object code.

OBJECT OF THE INVENTION

More particularly, the invention has the objective of improving the compacting of the program in interpreted object code, no longer by factorising the contiguous instruction groups but rather by identifying and processing the non-contiguous instruction groups so as to obtain new executable instructions by the use of original instrumentation systems of the interpreter.

This applies particularly, though not exclusively, to those interpreters which have a stack to carry out all the calculations.

SUMMARY OF THE INVENTION

To this end, it proposes a compression method which comprises a first step consisting of making said interpreter configurable in relation to the definition of new instructions, and then, for each program or program set, an object code interprets the following steps:

the identification in this program or this program set of similar but not necessarily contiguous instruction groups, with or without their static arguments (a static argument is an instruction with an argument located in the very code of the program, in contrast to a dynamic argument which is located in a register, a variable or an operand stack).

the replacement of all or part of these groups in the interpreted object code of the program or programs concerned by the newly-created specialised instructions, the configuration of the interpreter in relation to said newly-created specialised instructions so as to render it capable of interpreting the program or programs containing the newly-created instructions.

Advantageously, this method can comprise a test step with a view to choosing the instruction groups to be replaced so that, after replacement, one gets a compressed program of a size which is smaller than that of the program before compression, this choice taking account of the overcost related to instrumentation of the execution environment and/or of the object code.

BRIEF DESCRIPTION OF THE DRAWINGS

The embodiments of the invention will be described hereafter, in terms of non-exhaustive examples, with reference to the annexed drawings in which.

DESCRIPTION OF THE PREFERRED EMBODIMENTS

Figure 1:
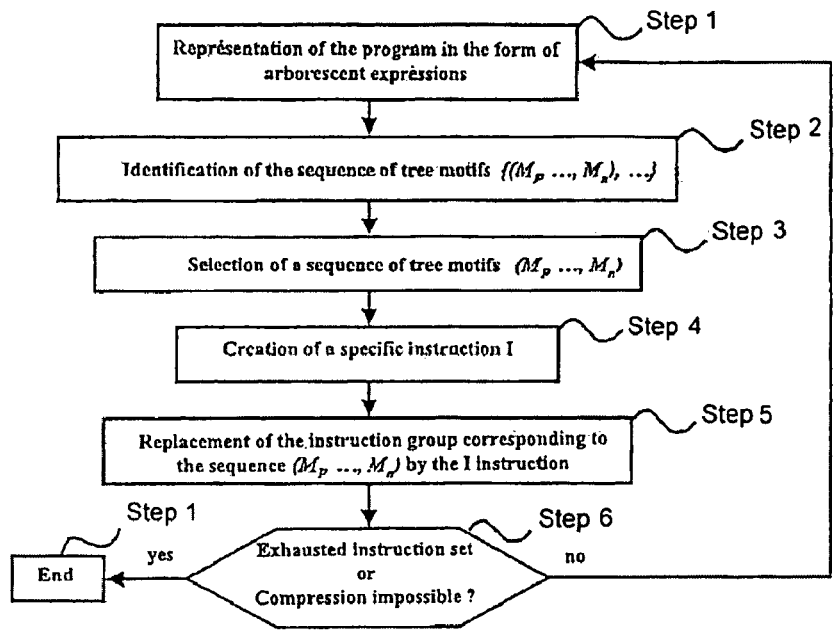
FIG. 1 is a flow diagram illustrating the operation of the method according to the invention.

In accordance with the flow diagram represented in FIG. 1, implementation of the method described above can comprise an operational sequence which has the following steps:

the construction of a representation of the calculations performed by the program in the form of arborescent expressions (Step 1), identification, in these arborescent expressions, of sequences of sub-expressions corresponding to the motifs appearing most frequently (in accordance with a criterion which has been left open, such as a threshold function concerning the frequencies of occurrence), where these motifs can be complete trees or configured by arguments (Step 2), that is with or without static argument, the selection of a sequence of tree motifs ($M_1, \ldots, M_n$) (Step 3), the association with the sequence of sub-expressions, selected in the preceding step, of a new instruction of the interpreter (Step 4), the reconstruction of an interpreted object form from the representation in the form of arborescent expressions, by replacing, in the interpreted object code of the program, the not necessarily contiguous instruction groups corresponding to each occurrence of the sequence of sub-expressions selected by the associated instruction (Step 5), addition of the definitions of the newly-created instructions to the file of the interpreter object code of the program and/or to the interpreter (given that the selection step (Step 3) is based on state-of-the-art techniques).

Of course this operational sequence then comprises a test (Step 6) to ascertain whether or not the instruction set is exhausted, or if compression has become impossible. In the negative case, the system returns to block 1 to carry out a new sequence of compression operations. In the affirmative case, however, the sequence ends (Step 7).

The invention proposes a technique for identification of the non-contiguous instruction groups which is based on the construction of a representation of the interpreted object code program in the form of arborescent expressions.

To this end, it offers to find, in the object code, complex calculation expressions (as they can appear, for example, in the high-level language which was used to write the program before compilation), and to identify, from among these expressions, sequences of sub-expressions which appear frequently in the program.

More precisely, the invention aims to represent the calculation operation groups in the form of arborescent expressions, given that in each case:

it implements an interpreter which has a stack to perform its calculations, a calculation operation is an instruction which takes arguments from an operand stack and returns (or does not return) a result to this stack, a calculation expression tree can be a group of instructions which are separated from each other by arbitrarily large distances in the original object code, by definition, for each calculation operation, op, of the intermediate object language, the associated tree constructor will be denoted op, and the arity of the op constructor is given by the number of arguments that the op operation reads from the stack of the interpreter.

In this example, the method according to the invention uses a simple iterative calculation algorithm which constructs a representation in the form of arborescent expressions for each sub-program of the interpreted object code from its instruction sequence by successive rewrites. Each rewrite step is defined in an extended instruction sequence, S, as follows, given that an extended expression is either a standard instruction or an arborescent expression:

If $S=(J_1, \ldots, J_m, E_1, \ldots, E_n, op, J_{m+1}, \ldots J_k)$ where op is of arity n then we rewrite S as:

$S'=(J_1, \ldots, J_m, \underline{op}(E_1, \ldots, E_n), J_{m+1}, \ldots J_k)$

Otherwise S remains unchanged

If $(I_1, \ldots, I_n)$ is the instruction sequence of the P sub-program, then this algorithm is applied iteratively to the extended instruction sequence $(I'_1, \ldots, I'_n)$ where:

$I'_i = \underline{c}$ if $I_i = c$ where $\underline{c}$ is of arity 0.

$I'_i = I_i$ otherwise.

up to the point where any other rewrite has become impossible.

The extended instruction sequence obtained at the end of this calculation is the representation of sub-program P in the form of arborescent expressions $\underline{P}$.

The invention will be illustrated below with reference to the following examples which are given as a guide only, in which:

Example 1 illustrates a method of representation, in the form of arborescent expressions, of a bytecode sequence expressed in JavaCard code.

Example 2 shows a method of factorisation of this sequence from its representation in arborescent form.

Example 3 is a method for the definition of specialised instructions as introduced in Example 2, using an internal stack.

Example 4 is a method for the definition of specialised instructions as introduced in Example 2, using a single stack.

EXAMPLE 1

In this example, just like all the others, we are considering the JavaCard software architecture. JavaCard is a complete software architecture (comprising an object-oriented high-level language, an interpreted object code, an object code interpreter of the stack machine type, an execution environment, standard libraries and a system of secure interactions between programs accommodated on a single card) for the execution of programs on smartcards in a multiple-application context. A JavaCard program is known as an applet. It is a passive reactive program which interacts with the terminal to which the card is connected, in the form of message transmission of the command-response type, the command being emitted by the terminal only, with the applet sending back a response for each command received. The interpreted object code language considered here is JavaCard bytecode. The bytecode interpreter is the JavaCard virtual machine (JCVM) which is installed in the smartcards.

Let us consider a JavaCard program which contains the following bytecode sequence:

sload 1
sload 2
sadd
sload 3
ssub
sload 4
sconst 2
baload
sconst 1
sconst 2
invokestatic "someComputation (short, byte, short, short)"

The sload n instruction reads the content of variable n and stores it at the top of the stack, the sadd instruction does the addition (and the ssub instruction the subtraction) of the two integers located at the top of the stack, storing the result in the stack, the sconst c instruction stacks the integer constant c, the baload instruction reads an element from the bytes table storing its content at the top of the stack, and the invokestatic instruction calls a sub-program. The integers concerned here are shorts, which are 16-bit integers, or bytes, which are 8-bit integers.

Figure 2:
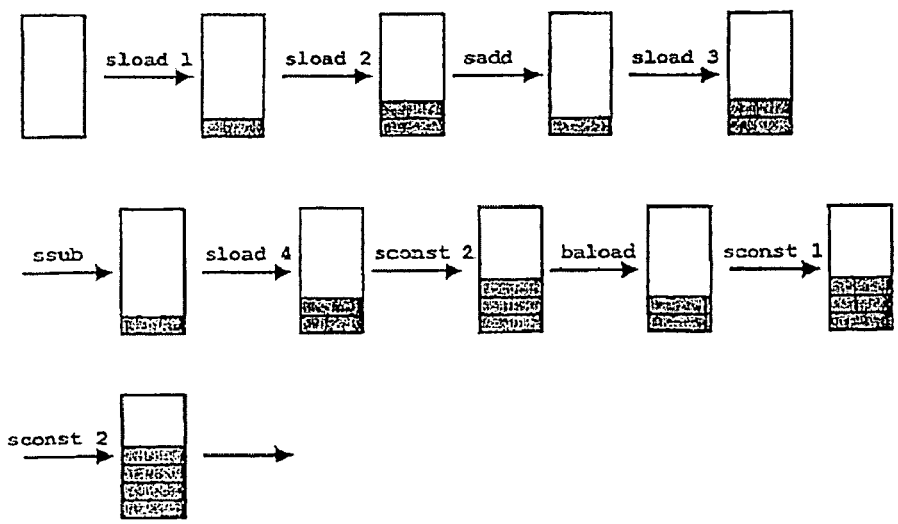
FIG. 2 is a schematic representation showing the modifications to the operand stack during the execution of an example of a JavaCard bytecode sequence.

The changes to the operand stack during the execution of this instruction sequence are shown in FIG. 2.

The representation of the previous sequence in the form of arborescent expressions has the following form:

invokestatic "someComputation (short, short, short, byte)" (ssub (sadd (sload 1, sload 2), sload 3), baload (sload 4, sconst 2), sconst 1, sconst 2)

We obtain a complex calculation expression similar to that which could be written, for example, in the high-level programming language which was used to produce the object code of the program concerned (JavaCard in this case).

The factorisation of arborescent expressions in accordance with the method according to the invention comprises a first step which consists of identifying the sequences of recurring motifs in the arborescent expressions appearing in the intermediate form of the program. A motif, M, is a term, that is an incomplete tree, of which the missing parts are represented by variables called $x_1, X_2, \ldots, X_n$. We will note the indices of the variables in ascending order of their occurrence in the postfixed path (that is in depth, from left to right, exploring the threads of a node before the node itself) of the tree to which they belong. For a sequence of motifs $(M_1, \ldots, M_k)$ the variables appearing in motifs $M_1, \ldots, M_k$ are also numbered in ascending order of their appearance in the sequence of motifs, moving through them from left to right, such as the following sequence for example: $(M_1 (x_1, x_2), M_2(x_3, x_4, x_5), M_3(x_6))$. If we associate a specialised instruction $I_{(M1, \ldots, Mk)}$ with each sequence of motifs $(M_1, \ldots, M_k)$ selected for factorisation, then the factorisation operation F(E) of an arborescent expressions E into a sequence of instructions is defined in the following manner (in accordance with the order of the cases):

$F(\underline{c}(E_1, \ldots, E_j, M_1(E^1_1, \ldots, E^1_{n1}), \ldots, M_k(E^k_1, \ldots, E^k_{nk}), E_{j+1}, \ldots, E_m) = F(E_1) o \ldots o F(E_j) o F(E^1_1) o \ldots o F(E^1_{n1})$
$o \ldots o F(E^k_1) o \ldots o F(E^k_{nk}) o (I_{(M1, \ldots, Mk)} o F(E_{j+1})$
$o \ldots o F(E_m) o (c)$ if the sequence $(M_1, \ldots, M_k)$ is selected for factorisation.

$F(\underline{c}) = (c)$, if $\underline{c}$ is of arity 0.

$F(\underline{c}(E_1, \ldots, E_n)) = F(E_1) o \ldots o F(E_n) o (c)$, if $\underline{c}$ is of arity n.

In these expressions, as in the remainder of the description, operator o denotes concatenation of the instruction sequence.

The search for sequences of motifs can be accomplished by numbering of the terms of limited size and filtering of the arborescent expressions of the program in accordance with these terms. The execution of this search, as well as the function for the choice of terms to factorise, are left open, because these involve the conventional techniques of the state of the art.

If $P = (J_1, J_2, \ldots, J_m)$ is the intermediate representation of sub-program P in the form of extended instruction sequences, which are either standard instructions or arborescent expressions, then the factorisation of P is defined by the following standard instruction sequence:

Fact $(J_1)$ o Fact $(J_2)$ o ... o Fact $(J_m)$ where Fact $(J) = J$ if J is a standard instruction and F (J) if J is an arborescent expression.

Example 2 below illustrates a method for the factorisation of expression trees of the bytecode sequence of example 1.

EXAMPLE 2

It is assumed that, in the program containing the code of Example 1, the motif search algorithm is selected as candidate for factorisation of the following motif sequence:

(ssub (sadd $(x_1, x_2), x_3$), baload $(x_4, x_5)$)

We name as ssub_sadd_baload the specialised instruction associated with this motif sequence. Then, after factorisation of the corresponding bytecode sequence, we obtain the following bytecode sequence:

sload 1
sload 2
sload 3
sload 4
sconst 2
ssub_sadd_baload
sconst 1
sconst 2
invokestatic "someComputation (short, byte, short, short)"

As mentioned previously, the method according to the invention comprises a step for instrumentation of the interpreter and/or of the interpreted object code file of the program so as to make it suitable for implementation of the newly created instructions in the executable.

This step occurs in the case where each specialised instruction is defined within the interpreter and/or in the object code of the program, by a sequence of instructions of the interpreted object language. The case of native implementation of these operations is not covered.

The execution of a specialised instruction requires modification of the method of execution of the interpreter, since factorisation breaks the logical link between the various intermediate calculations. Thus, in example 2, during execution of the specialised instruction, the addition operation must fetch its arguments from deep within the stack. The result of the addition cannot simply be stored at the top of the stack, since it corresponds to the first argument of the subtraction, which must necessarily be at a level below that of its second argument in the stack. There are two possible ways of instrumenting the interpreter to execute these instructions, namely a first way consisting of using an internal stack, and a second way consisting of performing a shift in the operand stack.

The first solution consists of using an internal operand stack during the execution of a specialised instruction, in order to perform all of the operations of which it is composed. The arguments used are copied from the standard operand stack to the internal stack by means of a new instruction, get_arg n, which takes as argument level n of the standard operand stack (from the top of the stack which corresponds to level 0) to be copied to the internal stack. In addition, it is necessary to associate the number of its arguments with each specialised instruction, in order to be able to remove them from the standard stack at the end of execution of the instruction, and to copy the residual content of the internal stack to the standard operand stack (which constitutes the final result of the associated instruction sequence).

If $(M_1, \ldots, M_k)$ is a sequence of motifs whose variables are $x_1, \ldots, x_n$, (that is all of the variables appearing in all the motifs of the sequence, numbered in accordance with the trajectory from left to right of the sequence and in accordance with the postfixed trajectory of each motif), then the semantic $S(I_{(M1, \ldots, Mk)})$ of the associated specialised instruction $I_{(M1, \ldots, Mk)}$, is the standard instruction sequence defined recursively in the following manner:

$S(x_i) = (get\_arg (n-i))$ $S(\underline{c}) = (c)$, if $\underline{c}$ is of arity 0

$S(\underline{c}(E_1, \ldots, E_k)) = S(E_1) o \ldots o S(E_k) o (c)$, if $\underline{c}$ is of arity k.

Example 3 illustrates a method for using an internal operand stack in the case of the specialised instruction ssub_ssad_baload of Example 2.

EXAMPLE 3

Figure 3:
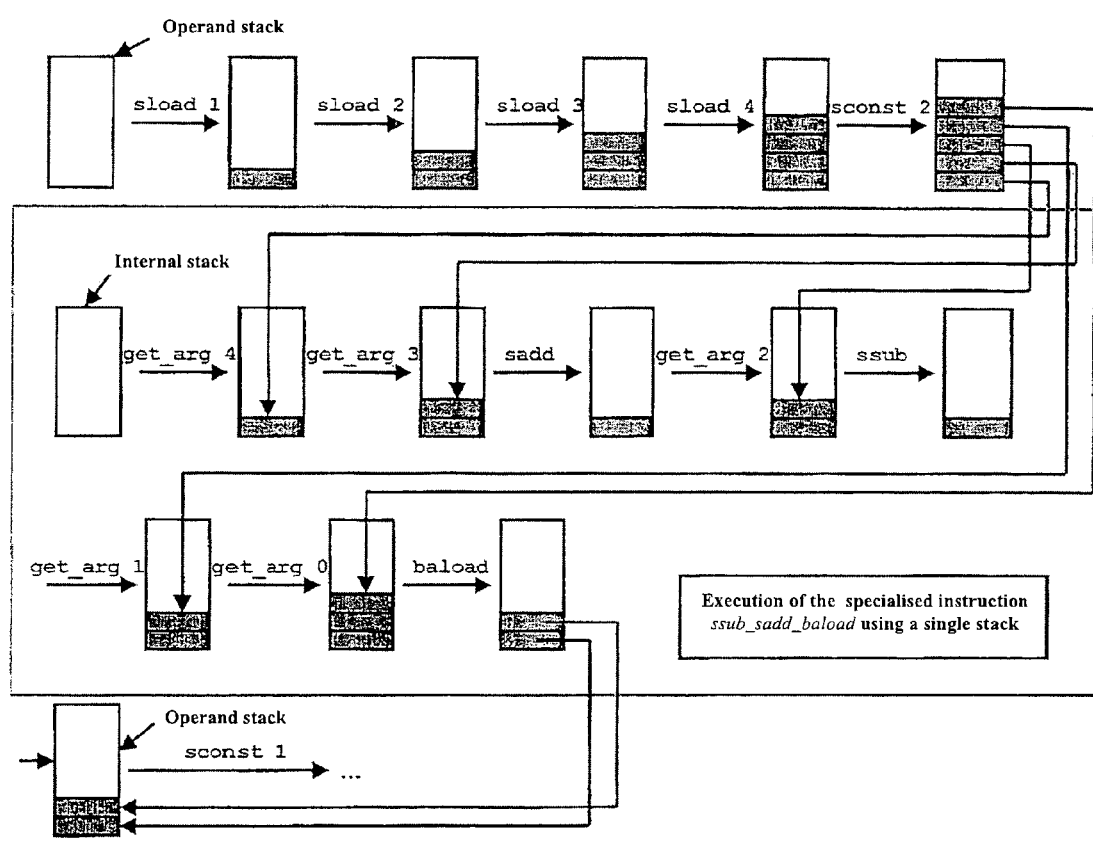
FIG. 3 is a schematic representation showing the changes to the operand stack and to the internal stack during execution of the instruction sequence illustrated in FIG. 2 after compression, which has introduced the ssub_sadd_baload specialised instructions.

The code corresponding to the definition of the specialised instruction ssub_sadd_baload of Example 2 is then as follows:

get_arg 4
get_arg 3
sadd
get_arg 2
ssub
get_arg 1
get_arg 0
baload The changes to the operand stack and to the internal stack during execution of the factorised instruction sequence of Example 2 are shown in FIG. 3.

The second solution for instrumentation of the interpreter uses only a single stack, the standard operand stack, but also introduces jump operations in the stack which allows one to position oneself at any arbitrary level. When an operation is performed within the stack, all of the levels located above are shifted (upwards or downwards according to whether the instruction of the executed interpreted language consumes arguments and/or stacks a result).

A new instruction, down n, has to be used to allow one to move by n levels below the current stack level, and also an up instruction which allows one to move by one level above the current stack level. No other information is necessary for execution of the specialised instruction. At the end of execution of the specialised instruction, the stack contains the final result of the associated instruction group.

If $(M_1, \ldots, M_k)$ is a sequence of motifs whose variables are $x_1, \ldots, x_n$, then we define an auxiliary semantic $S'(I_{(M1, \ldots, Mk)})$ of the specialised instruction $I_{(M1, \ldots, Mk)}$. This auxiliary semantic consists of the standard instruction sequence defined recursively as follows:

$S'(x_i) = (up)$ $S'(\underline{c}) = (c)$, if $\underline{c}$ is of arity 0

$S'(\underline{c}(E_1, \ldots, E_k)) = S'(E_1)$ o $\ldots$ o $S'(E_k)$ o $(c)$, if $\underline{c}$ is of arity k.

The semantic $S(I_{(M1, \ldots, Mk)})$ of the specialised instruction is the following instruction sequence:

$S(I_{(M1, \ldots, Mk)}) = (down\ n)$ o $S'(I_{(M1, \ldots, Mk)})$

The initial down n instruction is used to move to a level below the first argument of the specialised instruction, which is the argument located at the lowest level in the stack. Since the numbering order of the arguments is equal to their order of evaluation by the specialised instruction, each read of an argument requires a single shift upwards of the stack pointer using the up instruction.

Example 4 illustrates an instrumentation method which uses only the standard operand stack in the case of specialised instruction ssub_ssad_baload of Examples 1 and 2.

EXAMPLE 4

The code corresponding to the definition of specialised instruction ssub_ssad_baload is then as follows:

down 5
up
up
sadd
up
ssub
up
up
baload

Figure 4:
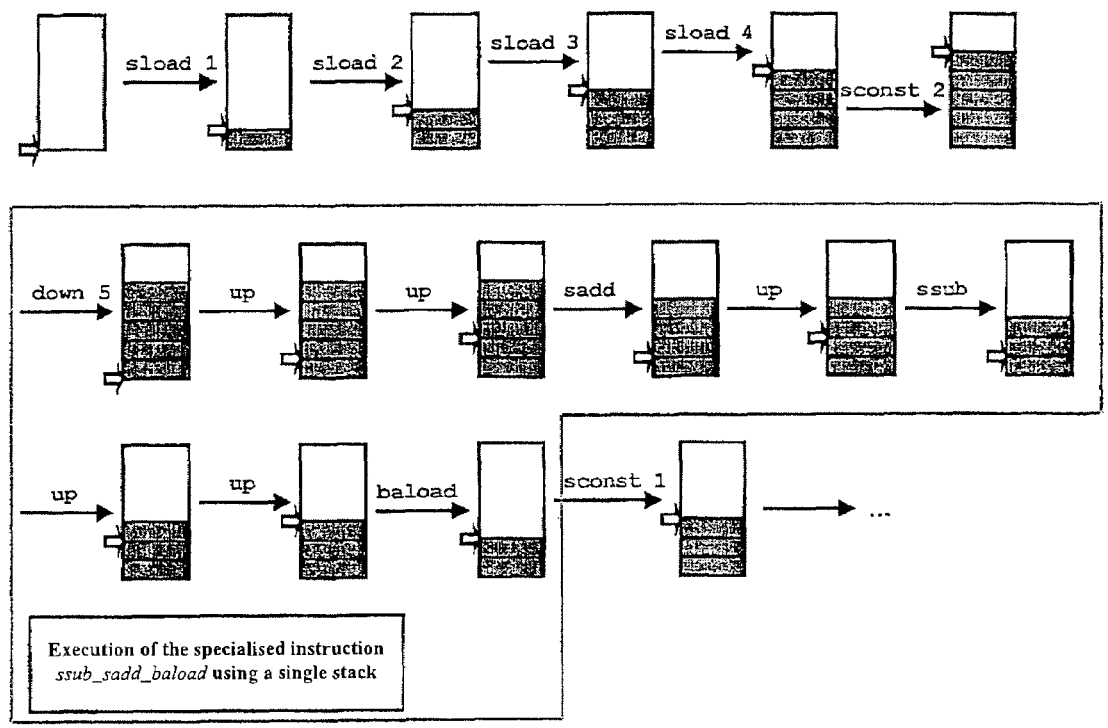
FIG. 4, in an analogue manner, illustrates the execution of this same instruction sequence using a single stack.

The changes to the operand stack during the execution of this instruction sequence are shown in FIG. 4. At each execution step, we have shown, by a pointer in the form of an arrow, the level in the stack where the calculations are performed.

It should be noted that the instruction sequence down 5
up
up is equivalent to the single instruction down 3

This optimisation enables the space necessary for instrumentation of the interpreter to be reduced.

The invention claimed is:

1. A method for compressing an interpreted object code of a program or a programs set comprising a sequence of code instructions in a system with a usual stack machine type interpreter having an operand stack and possibly an internal stack, said interpreter being adapted to perform software interpretation of said code instructions into instructions in machine language, which are directly executable by a processor, and being configured by using said internal stack or a shift of said operand stack in relation to new instructions, said method comprising the following steps:
    a first step of constructing a representation of calculations performed by said program or programs set in a form of arborescent expressions,
    a second step of identifying, in said arborescent expressions, sub-expressions corresponding to recurring sequences, said recurring sequences comprising complete trees or being configured by arguments,
    a third step of associating new instructions of the interpreter respectively with said recurring sequences,
    a fourth step of reconstructing an interpreted object code form from a representation of arborescent expressions, by replacing a code corresponding to the recurring sequences with not-necessarily-contiguous instruction groups identified by an associated new instruction,
    a fifth step of configuring said interpreter by adding thereto definitions of said new instructions so as to render it capable of interpreting the interpreted object code reconstructed in the fourth step.

2. A method according to claim 1, comprising a test step further comprising a choice of said instructions group of said program or programs set to be replaced so as to obtain, after replacement, a compressed program of a size which is smaller than that of said program or programs set before compression, said choice taking account of overcost related to instrumentation of an execution environment and/or of the object code.

3. A method according to claim 1,
    wherein said identifying step is performed according to a criterion consisting of a threshold function relating to the frequency of occurrence of said motif sequences.

4. A method according to claim 1,
    using an iterative calculation algorithm which constructs a representation in the form of arborescent expressions for each sub-program of the interpreted object code from its instruction sequence by successive rewrites.

5. A method according to claim 1,
    comprising a search for motifs by numbering of terms and filtering of the arborescent expressions of the program or programs set according to these terms.

6. A method according to claim 1, which comprises, in the event of using said internal operand stack, a step of using arguments which are copied from a standard operand stack to said internal stack by means of a new instruction, get_arg n, which takes as argument level n of the standard operand stack to be copied to said internal stack, and a step of associating, with each specialised instruction, a value reflecting how many arguments each specialised instruction has, in order to be able to remove the arguments from the standard operand stack at the end of execution of the instruction, and to copy a residual content of the internal stack to the standard operand stack.

7. A method according to claim 1,
    comprising, in the event that one performs a shift in the operand stack, a new instruction, down n, used to move n levels below a current stack level, and also an up instruction which allows one to move one level above said current stack level.

* * * * *